US010679506B2

(12) United States Patent
Szulc et al.

(10) Patent No.: US 10,679,506 B2
(45) Date of Patent: Jun. 9, 2020

(54) METHOD OF TRACKING A PLURALITY OF OBJECTS IN THE VICINITY OF A HOST VEHICLE

(71) Applicant: Delphi Technologies, LLC, Troy, MI (US)

(72) Inventors: Michal Szulc, Niepolomice (PL); Rafal Dlugosz, Poznan (PL); Pawel Skruch, Mogilany (PL)

(73) Assignee: Aptiv Technologies Limited (BB)

( * ) Notice: Subject to any disclaimer, the term of this patent is extended or adjusted under 35 U.S.C. 154(b) by 213 days.

(21) Appl. No.: 15/904,713

(22) Filed: Feb. 26, 2018

(65) Prior Publication Data

US 2018/0253974 A1 Sep. 6, 2018

(30) Foreign Application Priority Data

Mar. 1, 2017 (EP) ..................................... 17158599

(51) Int. Cl.
| | |
|---|---|
| G08G 1/16 | (2006.01) |
| G01S 13/93 | (2020.01) |
| G01S 17/93 | (2020.01) |
| G06K 9/00 | (2006.01) |
| G01S 13/931 | (2020.01) |
| G01S 13/52 | (2006.01) |

(Continued)

(52) U.S. Cl.
CPC .............. *G08G 1/166* (2013.01); *G01S 13/42* (2013.01); *G01S 13/52* (2013.01); *G01S 13/58* (2013.01); *G01S 13/726* (2013.01); *G01S 13/931* (2013.01); *G01S 17/42* (2013.01); *G01S 17/58* (2013.01); *G01S 17/66* (2013.01); *G01S 17/931* (2020.01); *G06K 9/00791* (2013.01); *G01S 2013/9323* (2020.01)

(58) Field of Classification Search
CPC ...... G01S 13/931; G01S 13/52; G01S 17/931; G01S 13/42; G01S 17/66; G01S 13/58; G01S 17/42; G01S 17/58; G08G 1/166; G06K 9/00791
See application file for complete search history.

(56) References Cited

U.S. PATENT DOCUMENTS

| | | | |
|---|---|---|---|
| 8,849,494 B1 * | 9/2014 | Herbach ............... | B60W 30/00 701/24 |
| 8,996,224 B1 * | 3/2015 | Herbach .............. | G05D 1/0011 180/116 |

(Continued)

FOREIGN PATENT DOCUMENTS

WO 2017/030493 A1 2/2017

OTHER PUBLICATIONS

Edman Viktor et al: "Pedestrian group tracking using the GM-PHD filter", 21st European Signal Processing Conference (EUSIPCO 2013), EURASIP, Sep. 9, 2013, pp. 1-5.

*Primary Examiner* — Mussa A Shaawat
(74) *Attorney, Agent, or Firm* — Joseph V. Bonadies

(57) ABSTRACT

A method of characterizing the environment with respect to a host vehicle, said vehicle including one or more systems adapted to detect single objects in the vehicle vicinity; comprising: i) determining the spatial location of a plurality of single objects in the vicinity of said vehicle; ii) grouping a plurality of said single objects based on one or more attributes of each single object into at least one group; iii) subsequently processing said group of objects as a single group object.

23 Claims, 4 Drawing Sheets

(51) Int. Cl.

| | |
|---|---|
| *G01S 17/58* | (2006.01) |
| *G01S 13/42* | (2006.01) |
| *G01S 13/58* | (2006.01) |
| *G01S 13/72* | (2006.01) |
| *G01S 17/66* | (2006.01) |
| *G01S 17/42* | (2006.01) |
| *G01S 17/931* | (2020.01) |

(56) References Cited

U.S. PATENT DOCUMENTS

| | | | | |
|---|---|---|---|---|
| 9,008,890 | B1* | 4/2015 | Herbach | B60W 30/00 |
| | | | | 701/26 |
| 9,097,800 | B1* | 8/2015 | Zhu | G01S 13/865 |
| 9,719,801 | B1* | 8/2017 | Ferguson | G01O 25/00 |
| 9,771,055 | B1* | 9/2017 | Zhang | B60T 8/174 |
| 10,131,446 | B1* | 11/2018 | Stambler | G05D 1/101 |
| 10,421,397 | B2* | 9/2019 | Chaaya | B60Q 9/007 |
| 10,479,274 | B2* | 11/2019 | Park | B60Q 1/525 |
| 2003/0058157 | A1 | 3/2003 | Sassman et al. | |
| 2012/0083947 | A1* | 4/2012 | Anderson | B60W 30/09 |
| | | | | 701/3 |
| 2013/0083061 | A1* | 4/2013 | Mishra | H04N 5/265 |
| | | | | 345/633 |
| 2013/0151058 | A1* | 6/2013 | Zagorski | B60W 30/09 |
| | | | | 701/23 |
| 2013/0325202 | A1* | 12/2013 | Howard | B60W 30/08 |
| | | | | 701/1 |
| 2016/0339959 | A1* | 11/2016 | Lee | B62D 15/0265 |
| 2017/0036673 | A1* | 2/2017 | Lee | A61B 3/112 |
| 2017/0101056 | A1* | 4/2017 | Park | B60Q 9/008 |
| 2017/0254880 | A1* | 9/2017 | Smith | G01S 13/86 |
| 2019/0276034 | A1* | 9/2019 | Fung | G06K 9/00892 |
| 2019/0300002 | A1* | 10/2019 | Fung | G06K 9/00536 |

* cited by examiner

METHOD OF TRACKING A PLURALITY OF OBJECTS IN THE VICINITY OF A HOST VEHICLE

TECHNICAL FIELD OF INVENTION

This disclosure generally relates to a vehicle system that provide data relating to the environment of the vehicle, in particular to obstacles and objects in the vicinity of the vehicle. In particular, aspects of the invention relate to an improved method of determining contours or boundaries that indicate regions unpermitted to the vehicle and has application to collision warning and other such systems.

BACKGROUND OF INVENTION

It is known to equip vehicles with radar systems and/or cameras systems in order to characterize the environment surrounding a vehicle. Such systems are able to provide detection of objects in the vicinity of the vehicle, in particular in a forward-looking direction. So, processing of image data and/or radar reflection data allows objects in the vicinity of the vehicle to be detected and characterized. Such object identification or detection can be used to detect static objects such as guardrails, walls, trees, boundaries, posts or stationary vehicles for example, or moving objects such as other vehicles or pedestrians. This data can be processed and used to provide e.g. a boundary (line) or contour line(s) where vehicle movement is to be prohibited in order to prevent collision.

In such Advanced Driver Assisted Systems (ADAS systems) both cameras mounted on the vehicle and/or antenna arrays may be used to detect/identify and characterize such objects. Typical vehicles with ADAS systems are equipped with an antenna unit/array and a receiver unit adapted to detect radar reflections (returns) reflected from objects. These radar reflections are also referred to as detections. In this way, the surrounding environment may be characterized and objects detected. Alternatively, or additionally cameras may be used to capture images of the environment and stationary or moving objects identified from these using known image processing techniques. It is often necessary to also distinguish between different types of objects (such as other vehicles, pedestrians or other objects), and also whether these are moving or stationary.

The data which is processed to determine objects in the vehicle vicinity may be derived from both radar and camera data. Such data is often referred to as multisensory fusion of data provided by the camera(s) and radar(s).

Objects may be classified into classes or groups such as for example vehicles, cyclists and pedestrians. Such objects are regarded as single entities referred to as single objects (SOs).

A problem is sometimes the sheers number of objects that need to be processed. This introduces a bottleneck; having a large number of such objects that need to be processed in a usually limited time, in hardware with limited computational resources. The problem is also only a limited amount of data can be sent over data buses between two or more computational units in a single system.

The problem becomes especially apparent in the urban environment, in which the number of SOs (pedestrians and other vehicles) is usually much larger than, for example, on highways. The number of such objects is also usually higher than can be handled by current ADAS systems, due to hardware limitations. Furthermore, changes in parameters of such objects (such as speed/direction) are much more unpredictable and dynamic in the urban environment. For example, pedestrians can suddenly change their motion; direction and speed. From, a set of SOs, algorithms must quickly select the most important objects, usually based on the safety-related criteria, and focus on them in detail. This task is usually not trivial taking into account, for example, delays introduced by filters that are used to enhance the parameters of the objects. One of the common problems is the possible loss of the confidence due to overlapping or joining two or more SOs. It is common in the urban environment in which objects are located close to each other. Additionally each SO needs to be characterized by a set of parameters (including positions and velocities) that have to be kept in memory.

SUMMARY OF THE INVENTION

In one aspect is provided a method of characterizing the environment with respect to a host vehicle, said vehicle including one or more systems adapted to detect single objects in the vehicle vicinity; comprising i) determining the spatial location of a plurality of single objects in the vicinity (e.g. within 100 meters) of said vehicle;

ii) grouping a plurality of said single objects based on one or more attributes of each single object into at least one group;

iii) subsequently processing said group of objects as a single group object.

Step iii) may comprise forming a single boundary in respect of said group.

Said boundary may be a partial boundary, said boundary being formulated by processing the spatial position of those single objects in the group which are proximal to said vehicle.

Said objects may be moving objects and may be grouped according to their spatial position.

The method may include the step of identifying a cluster of single objects.

Said objects may be grouped according to one or more of the following parameters: object type, spatial position, speed, and direction of movement.

Said object type may be one of cyclists or pedestrians.

The method may additionally including tracking the movement of one or more objects of said group and subsequently reformulating the boundaries of one of more groups.

The method may include determining if an object of a first group moves such that it is in closer proximity to the boundary of a second group than the boundary of said first group, relative to said vehicle, and if so assigning said object to said second group.

The method may include comparing, consequent to movement of said single object, a) the increase in the angle spanning said first group relative to said vehicle when said single object is considered belonging to said first group with b) the increase in angle spanning said second group relative to said vehicle, when said single objects is considered belonging to said second group, and dependent thereupon, determining whether said object should belong to said first or second group.

The method may include merging two groups to form a single group.

The method may include the step of reformulating the boundaries of one or more of said first, second or merged groups.

Groups may be merged if any single object of a first group moves within a predetermined distance of any single object of a second group, or if the span angle between two adjacent groups relative to the vehicles is less than a predetermined threshold.

Data used in step a) to determine the spatial location of said plurality of objects in the vicinity of said vehicle, may be derived from one or more of the following on-board systems: camera, Radar and Lidar systems.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention is now described by way of example with reference to the accompanying drawings in which.

DETAILED DESCRIPTION

Figure 1A:
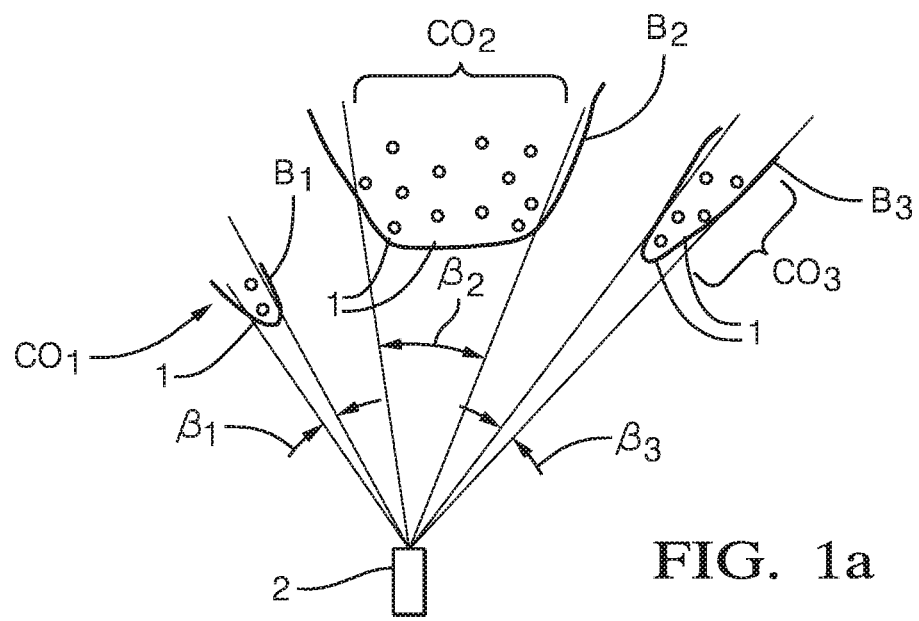
FIGS. 1a, b, and c show the formation of crowd objects with boundaries.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In a typical current methodology, algorithms try to identify and track each moving object such as pedestrian and vehicle even if they are located very close to each other.

In one aspect of the current invention is introduced a (new) object class which describes a set of separate/single objects of the same type (e.g. pedestrians) or similar types (e.g. pedestrians and cyclists), that are located in close proximity to each other and/or for which other attributes of the single objects have similar values (e.g. similar absolute values of speed, similar values of (e.g. walking) direction, etc.). The new class of objects may be referred to as a crowd object (CO).

This object class (crowd object) can be subsequently processed by known methodology such as automotive Advanced Driver Assistance System (ADAS) algorithms, such as providing a boundary or contour with respect to the crowd object.

In other words in aspects of the invention, a plurality of single objects are grouped and treated as a single (crowd) object for subsequent processing steps. The subsequent processing steps may such as formulating a boundary with respect the crowd object, demarking areas not permitted to the vehicle or to produce distance or collision warnings. In particular a single boundary is formulated with respect to the crowd object.

So similar objects having e.g. similar attributes may be classed as single (crowd) object for the further processing steps. For example a group of pedestrians may be treated as a single "crowd" objects rather than a collection of single objects. In examples, the single objects (e.g. pedestrians forming the crowd object) may be grouped according to other attributes such as general direction or speed of travel.

In one aspect, single objects such as pedestrians or cyclists and such like, are grouped to together, to form a single "crowd" object based on proximity. Thus clusters of single objects (i.e. within close proximity to each other) are grouped together.

A group of pedestrians often move generally in one and the same direction; thus in advanced aspects, crowd objects are determined from other attributes (e.g. optionally in addition to proximity) such as speed. Pedestrians often travel in groups the same direction; typically in two directions on a road such as by a pedestrian crossing, or along a pavement. The invention produces enhance efficiency as will become clear. Additionally cyclists often travel as groups, further travelling in the same direction and/or at similar speeds. By grouping single objects such as cyclists and pedestrians travelling in the same general direction/and or at the same speed, processing can be reduced. Aspects of the invention thus simplify subsequent analysis by decreasing the number of objects that have to be processed during the analysis of the scene. Instead of having a set of objects with individual attributes, only one crowd object is formulated with its own set of attributes.

Assuming that we have n single (individual) objects, each having m attributes, the crowd object may be formulated having p attributes in total. In the grouping operation (i.e. crowd forming), usually n·m>p or even n·m>>p. This happens also in case where m<p.

Aspects of the invention providing a better semantic description of the actual situation around the host vehicle. For example, a set of people walking on the pavement close to each other, described as a crowd better reflects the reality than same persons considered as separate and independent objects. It happens because the particular attributes (e.g. speed, walking direction, etc.) of the objects creating the crowd are in fact not fully independent from each other.

Usually, in prior art systems, where there is a crowded scene comprising a large number of single objects, i.e. particular SOs are identified (discriminated from each other), but often with a low value of the, so called, confidence level. The low value of the confidence level for a SO means that the system is "not sure" as to the existence and classification of this SO. This further results in the objects (SOs) potentially having incorrect values of particular attributes.

In aspects of the invention, after the SOs are grouped into a single (crowd) object, CO, the confidence level of this CO will be higher than the confidence levels of the particular SOs—members of that CO.

In crowded scenes, if the CO is detected as the one placed nearest the vehicle, it will effectively obscure all the objects behind it In aspects a new "crowd" object (CO) that groups together many (single) objects of a given type (or possibly also of different types) is determined. The first stage is detecting single objects, and grouping them so as to form at least one crowd object. These single objects are thus selected having similar attributes. The single objects may be grouped to a particular crowd according to one or more of the following: the type of objects (e.g. pedestrian): the location if the single objects are in close proximity to each other (i.e. if a cluster of closely grouped single objects is identified); the speed and/or direction of travel of the single objects.

In the next step a boundary is formed in relation to the grouped objects (crowd object). The most important requirement when determining a boundary is, from the perspective of the host vehicle, determine the areas that are forbidden for the vehicle (non-transparent) due to being occupied by the crowd.

According to one aspect therefore, a boundary is formed representing the outside periphery (or portion thereof) of the crowd object.

The boundary may be formed of only part of the periphery, that which is closest to the host vehicle. In some aspects, the shape of the boundary is s determined on the basis of the parameters of only selected SOs (usually located in the closest proximity to the host vehicle).

Once the crowd object is identified, the boundary may be determined by known position of the single objects, and can be determined by known techniques. Furthermore the boundary may vary due to dynamic changes; i.e. due to movement of individual single objects that make up the crowd object. Boundaries can be determined by known techniques such as glued quadratic Bezier curves, or polynomial lines or broken lines. Considerations for boundary formulation include the computational complexity required to compute the boundaries; for example the larger degrees of Bezier curves are not preferable for that reason.

Independently on the selected type of line, the boundaries can be described by a set of points, in particular by the positions of the single objects, in relation to the environment of the host car. The boundary may be defined by polar or Cartesian coordinates (the coordinate plane, whose zero point is located in the host vehicle).

Due to the dynamic changes of the positions of the points i.e. single objects, the trajectories of the single objects may be estimated or tracked in order to predict future boundaries (shapes).

As mentioned the boundary of the crowd object may be a partial boundary formulated from the single objects that lie closest or in general sight of the host vehicle. So, for example only the front row of a group of single objects (e.g. pedestrians) may be used to formulate a boundary of the crowd object. When considering areas which are prevented for travel with respect to the vehicle, it is not important to consider those single objects that are distant to the vehicle; e.g. that lie behind others. In this way processing time and requirements are reduced. Preferably number of points used to formulate a crowd object boundary is not more than 5 to 15, depending on the distribution of the SOs in the crowd. As a result, the number of resultant parameters with respect to the boundary is much less than the number of corresponding parameters in case of considering pedestrians/vehicles as separate objects.

The determination of the boundaries of the CO can be performed by known multi-sensory data fusion algorithms. Such algorithms process data received from different data sources, for example, cameras, radars and LIDAR's.

Once the crowd object boundaries have been formulated, a subsequent task may be to use these in known subsequent methods such as e.g. Target Selection (TSEL) algorithms, as well as Autonomous Emergency Breaking (AEB) algorithms. This task generally consists of determining if the trajectory of the host vehicle has any common areas with the surrounding COs.

In currently used algorithms, pedestrians, cyclists and the vehicles are considered as separate objects. The number of such objects that can be processed in the real-time regime is limited due to the bottlenecks described above. If a large group of SOs is replaced by only several COs, this problem will be strongly reduced.

According to aspects the CO groups many SOs (participants of the traffic), and in subsequent processing the methodology may focus only on the most important features of the CO considered as a unity, rather than on separate SOs. This substantially reduces the amount of data that have to be processed.

Some aspects the SOs are considered dynamic i.e. they shift (pedestrians and vehicles), and so in refined methodology, trajectories of selected points (located on the boundary) are predicted/determined. In this way the boundary of one or more crowd objects may be re-defined in time. This may be performed by tracking the single objects, and preferably e.g. only those closest to the host vehicle or those single objects that were used to formulate the boundary.

The COs may be formulated detection of single objects or detections from sources of one or more different types (cameras, radars and/or LIDAR's), This allows to create dynamic "ad-hoc" maps of the environment of the host car, which offer much larger confidence than in case of the algorithms that base on the radar scans only. Since particular SOs offer much higher confidence than single rough radar detections, the angle of sight of the host car can be divided into smaller number of slots which substantially reduces the complexity of the algorithms.

As mentioned, in preferred embodiments, the boundaries of the COs are non-static. In other words, the boundaries may vary and change depending on more recent data. The shapes of the boundaries may depend on the positions of particular members (SOs) of the COs, as well as the position of the host vehicle. Furthermore, in advanced embodiments the crowd objects may be dynamic and the movement of a single objects may redefine crowd objects. For example, depending on the movement of a single object, the single object may be removed from m one the crowd object and added to a different crowd object. The boundaries of both crowd objects may then be reformulated.

FIGS. 1a, b and c show illustrations of examples. In the case of FIG. 1a, a host vehicle 2, hereafter often the vehicle 2, having appropriate sensors of the type described above (RADAR, cameras) determines a number of single objects, in 2-dimensional space in the horizontal plane (plan view) from image processing or radar return processing. The single objects are grouped into a number of crowd objects, designated CO1, CO2 and CO3. These crowd objects are formulated on the basis of the geographical position of the single objects; here the crowd objects are formulated by identifying close clusters of single objects (all of the same type e.g. pedestrians). Assignment of the single objects to particular crowd objects depends on the attributes such as object type (pedestrian) object location, and objects speed/direction, and clustering. Generally, the single objects having close proximity to other objects may form part of the same crowd object.

In the figure the vehicle system determines three crowd objects CO1 CO2 and CO3. In the examples boundaries are formulated in respect of each crowd objects, designated B1 B2 and B3 respectively. The crowd objects span the angles $\beta1$, $\beta2$ and $\beta3$ respectively. As can be seen these may only be partial boundaries; the partial boundary being that portion of the periphery of the crowd object closest to the vehicle 2.

Figure 1B:
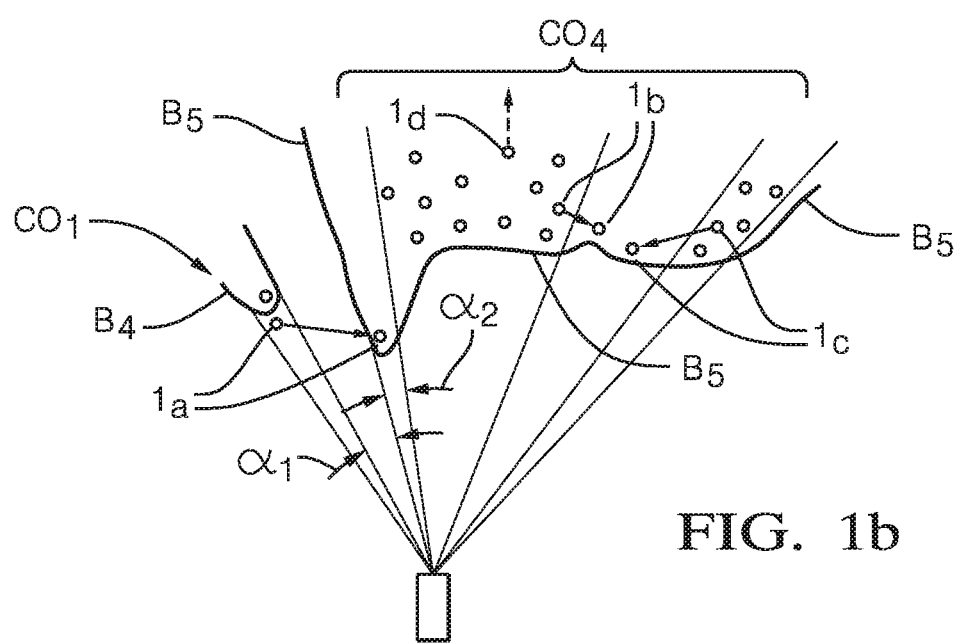

In FIG. 1b due to subsequent relocation of three SOs (shown by arrows) the shapes of particular boundaries of the crowd objects are modified. The single objects 1a, 1b, and 1c move i.e. shift their locations as shown by the arrows. Since the gap/distance between CO2 and CO3 becomes smaller than a pre-determined threshold due to movement of single objects 1b and 1c, the crowd objects CO2 and CO2 are thus joined together into a single new crowd object CO4, with revised boundary B5. With respect to CO1, due to movement of single object 1a the boundary of crowd object CO1 is redefined. The new position of 1a is such that it is close enough to previous crowd object CO2 (now crowd object CO4) and becomes part of crowd object CO4. One way this criterion may be decided (whether to allocated a position-shifted single object) is that here the increase of angle $\beta1$ with respect to crowd object CO1 which would be $\alpha1$ if the single object 1a remained part of CO1, is more than the increase in angle $\beta2$ of crowd object CO2/CO4 (which is $\alpha2$) when single object 1a is moved to crowd object CO2/CO4. New boundaries B5 and B3 of crowd object CO2/4 and CO1 are formulated respectively.

Figure 1C:
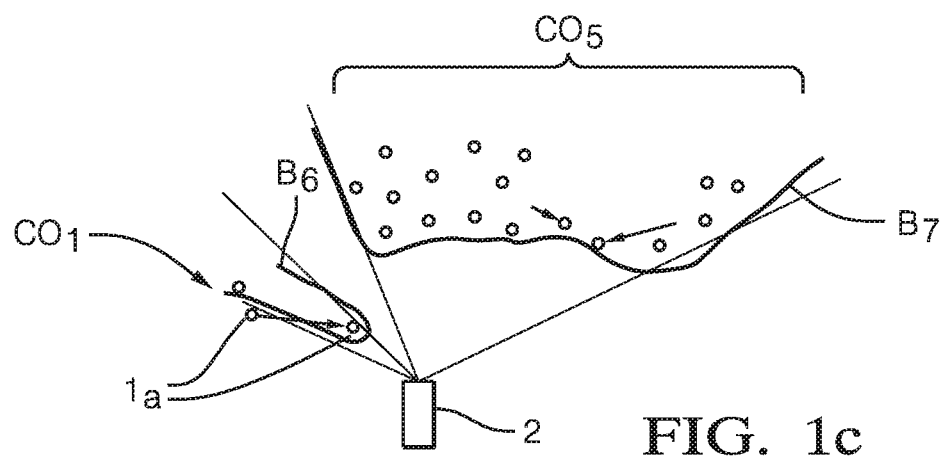

In FIG. 1c is shown what happens when the situation of FIG. 1a changes with the same shift in position of single objects 1a 1b and 1c of FIG. 1a as well as a shift in position of the host vehicle 2. Thus, relative positions have all changed. It is to be noted that in practice the movement of single objects (e.g. pedestrians) and the host car occur in the same time. Here they are shown separately, only for the illustration. Here, as before, the movement of single objects 1b and 1c again means the gaps between crowd objects CO2 and CO3 is reduced such that they are combined to form a single crowd object CO5. With the new vehicle position it is decided that the single object 1a will remain part of CO1 but the border thereof (B7) is reformulated. This is because, from the perspective of the vehicle, the increase of angle $\beta1$ with respect to crowd object CO1 if the single object 1a remains part of CO1, is less than the increase in angle $\beta2$ of crowd object CO2 (which is $\alpha3$) if the single object 1a were to be moved to crowd object CO2. Again, new boundaries B5 and B3 of crowd object CO2 and CO1 are formulated respectively.

It is to be noted that if a single object 1d moves as shown in FIG. 1b, this will not affect the boundary as it is at the back.

It is also to be noted that crowd objects may overlap. For example, a crowded scene may comprise a group of pedestrians, which are moving in one direction or another direction. Two crowd objects may be formulated, one formed from the group which are travelling in a similar direction and another crowd object formulated by the group of SOs that are travelling in different directions. It may be that there is a single object (cyclist) here which travelling in one direction but who is located in the middle of a group of other objects (cyclists) moving in a different direction. In examples this object would not form part of the crowd object (group) that it is amongst.

Figure 2:
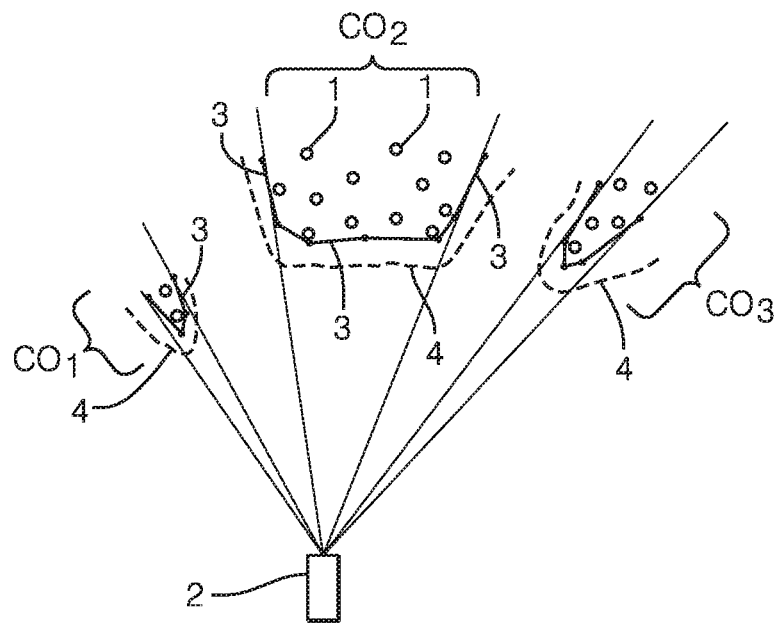
FIGS. 2 and 3 shows how boundaries with respect to crowd objects can be formulated.

Several example types of line can be used determine the shapes of the boundaries of the crowd as mentioned earlier. A good approximation provides a broken line 3 (continuous or not continuous) composed of straight sections, as the determination of the shape of the boundaries with a very high precision is sometimes not important; this is shown in FIG. 2. The straight line sections may be refined to form more appropriate curves (not shown) by known interpolation and other techniques. A safety margin may be provided assumed, which is the area that is not physically occupied by the crowd, but is also forbidden for access of the vehicle. A borderline contour with safety margin is illustrated in FIG. 2 with reference numeral 4.

Figure 3:
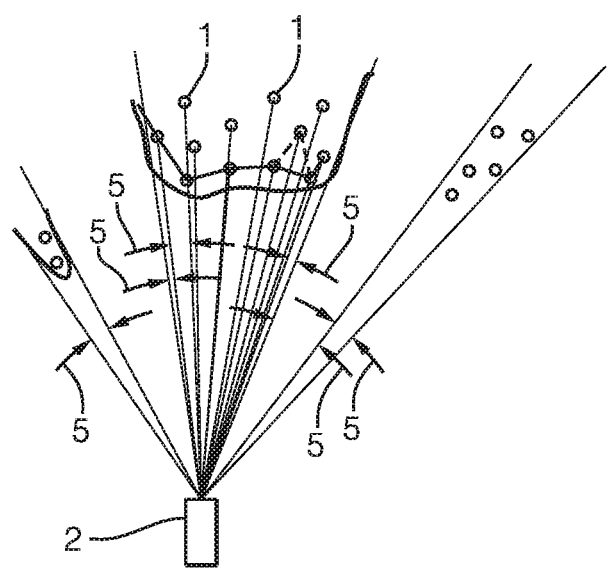

In order to determine the positions of the points that form the boundaries of the COs, one of the possible methods is to use polar coordinates of particular SOs. In this approach particular SOs are sorted according to their angle coordinates. Then, if we divide the angle of sight into some number of slots 5, we can determine in each slot the SO that is located in the closest proximity to the host car. This SO—the representative of a given slot—can be potentially used as the point belonging to the boundaries of the CO. In case, if the boundaries are the continuous line, two adjacent representative points are joined by a line, which becomes a segment of the overall broken line. This is illustrated in FIG. 3.

The number of points in the boundaries of a given CO can be minimized by smoothing the shape of the overall broken line. If we imagine a waveform composed of distances of particular points to the host vehicle (in polar coordinates, with the host car located in the central point of the polar coordinate system) as a function of the angle at which these points are located, we can smooth this waveform by the use of the anti-aliasing Finite Impulse Response (FIR) filters or the median filters, followed by the decimation (down-sampling) operation.

Figure 4A:
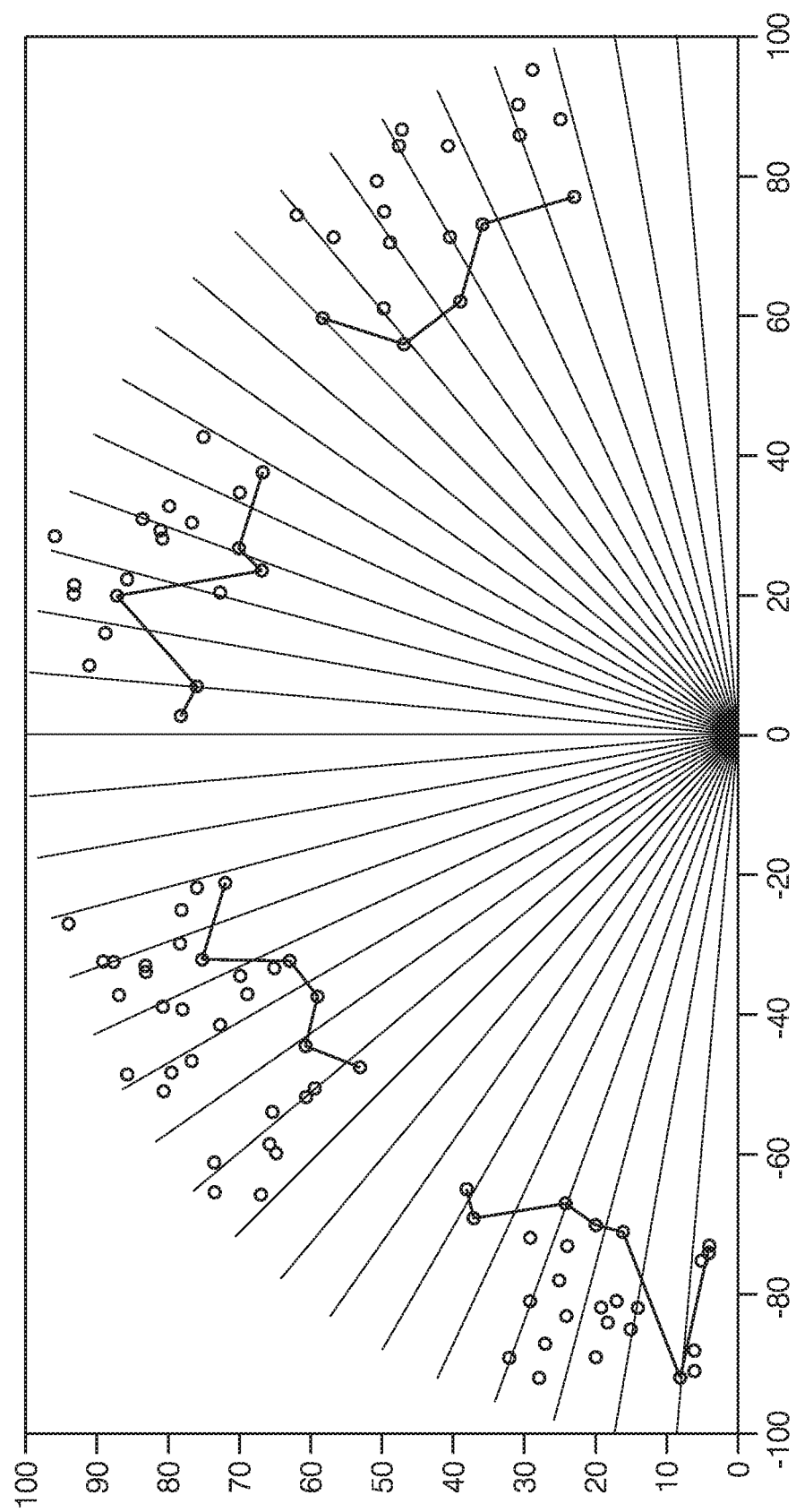
FIGS. 4a and 4b illustrates methods for smoothing the shape of the boundaries of crowd objects before and after FIR filtering and shifting respectively.
Figure 4B:
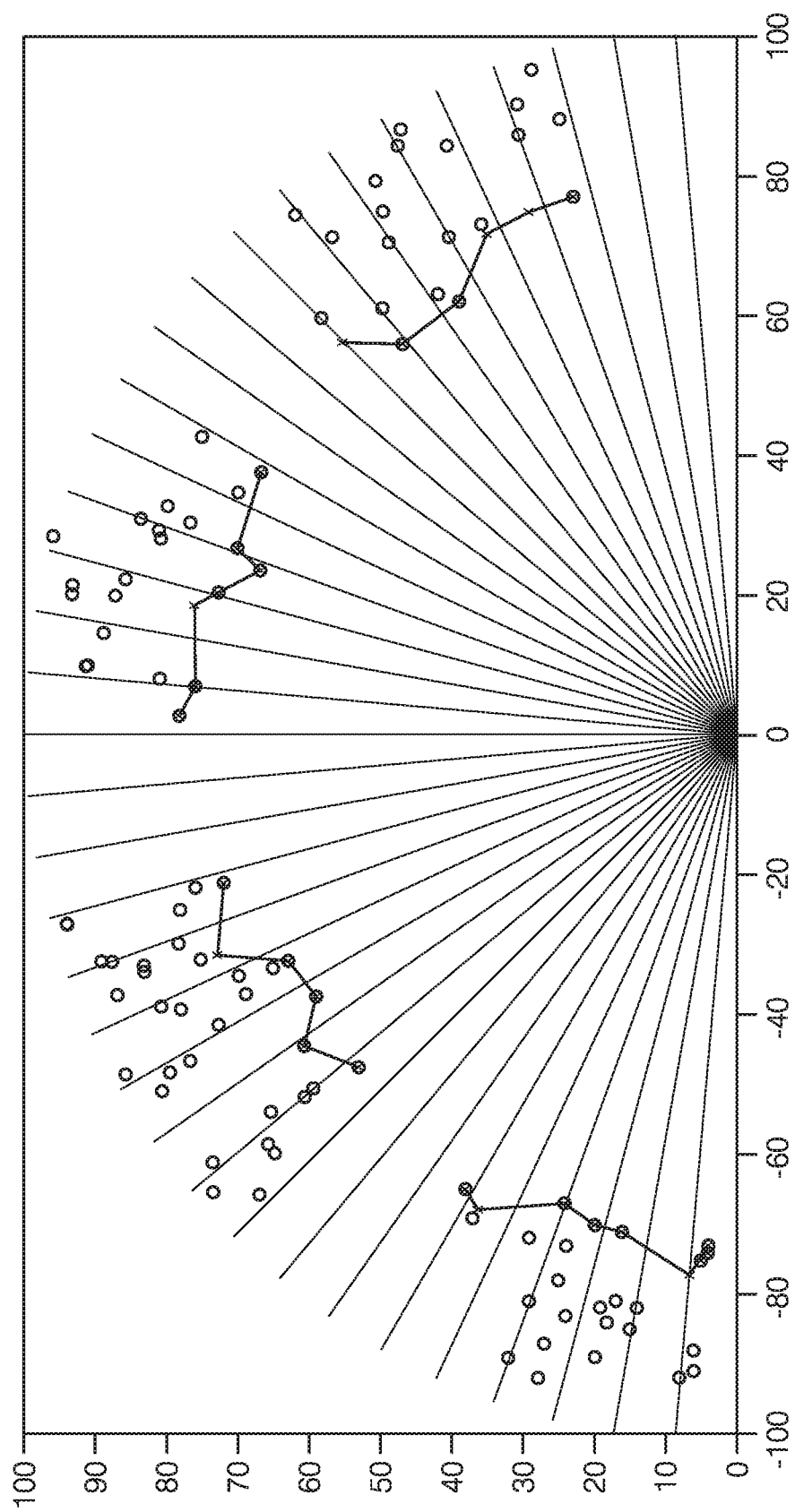

However, even without the decimation operation, the FIR filtering itself allows for smoothing the shape of the boundaries, as presented in FIGS. 4a and 4b. In this method, however, it is preferable to introduce an additional shift operation, due to following reason: before the filtering operation one can observe oscillations with relatively large amplitude. After the low-pass FIR filtering the amplitude of the oscillations becomes smaller, which may lead to a situation in which distances from the host car to selected points increases. This would lead to shrinking the area forbidden for the car. To avoid this situation, the overall resultant waveform may be shifted by such values for which all resultant points are at least as close to the host car as their corresponding initial points. FIGS. 4a and b illustrate an for smoothing the shape of the boundaries of the crowd objects; FIG. 4a shows the boundaries before FIR filtering, and FIG. 4b shows the boundaries after filtering and shifting.

In summary, the effective new crowd object substitutes many single objects and thus simplifies data processing in the processing methodology such as ADAS algorithms. Aspects provide the ability to dynamically change boundaries of the crowd object. The methods can be dedicated to both stationary and movable objects such as pedestrians and other vehicles. The crowd object can be determined on the basis of several data from a plurality of sources, such as cameras, radars and/or LIDAR's. This increases the confidence of particular points which makes the boundaries of the object stable over time.

While this invention has been described in terms of the preferred embodiments thereof, it is not intended to be so limited, but rather only to the extent set forth in the claims that follow.

We claim:

1. A method comprising:
determining a spatial location of single-objects in the vicinity of a vehicle;
grouping a plurality of said single-objects in accordance with one or more attributes of each single-object into group-objects;
defining boundaries of the group-objects;
determining that, relative to the vehicle, a single-object of a first-group has moved closer to a second-boundary of a second-group than a first-boundary of the first-group, and assigning said single-object to said second-group in response to the determining that, relative to the vehicle, the single-object of the first-group has moved closer to the second-boundary of the second-group than the first-boundary of the first group.

2. The method as claimed in claim 1 wherein said boundary is a partial boundary, said boundary being formulated by processing the spatial position of those single objects in the group which are proximal to said vehicle.

3. The method as claimed in claim 1 wherein said objects are moving objects.

4. The method as claimed in claim 1 wherein said objects are grouped according to their spatial position.

5. The method as claimed in claim 4 including the step of identifying a cluster of single objects.

6. The method as claimed in claim 1 wherein said objects are grouped according to one or more of the following parameters: object type, spatial position, speed, and direction of movement.

7. The method as claimed in claim 6 wherein said object type may be one of cyclists or pedestrians.

8. The method as claimed in claim 1 including comparing, consequent to movement of said single object, a) the increase in the angle spanning said first group relative to said vehicle when said single object is considered belonging to said first group with b) the increase in angle spanning said second group relative to said vehicle, when said single objects is considered belonging to said second group, and dependent thereupon, determining whether said object should belong to said first or second group.

9. The method as claimed in claim 1 including merging two groups to form a single group.

10. The method as claimed in claim 8 including the step of reformulating the boundaries of one or more of said first, second or merged groups.

11. The method as claimed in claim 10 wherein said groups are merged if any single object of a first group moves within a predetermined distance of any single object of a second group, or if the span angle between two adjacent groups relative to the vehicles is less than a predetermined threshold.

12. The method as claimed in claim 1 wherein data used in step i) to determine the spatial location of said plurality of objects in the vicinity of said vehicle, is derived from one or more of the following on-board systems: camera, Radar and Lidar systems.

13. A means for characterizing the environment with respect to a host vehicle, said vehicle including one or more systems adapted to detect single objects in the vehicle vicinity comprising:
a means for determining a spatial location of single-objects in the vicinity of a vehicle;
a means for grouping a plurality of said single-objects in accordance with one or more attributes of each single-object into group-objects;
a means for defining boundaries of the group-objects;
a means for determining that, relative to the vehicle, a single-object of a first-group has moved closer to a second-boundary of a second-group than a first-boundary of the first-group, and a means for assigning said single-object to said second-group in response to the determining that, relative to the vehicle, the single-object of the first-group has moved closer to the second-boundary of the second-group than the first-boundary of the first group.

14. The means for characterizing the environment with respect to a host vehicle as claimed in claim 13, wherein said boundary is a partial boundary, said boundary being formulated by processing the spatial position of those single objects in the group which are proximal to said vehicle.

15. The means for characterizing the environment with respect to a host vehicle as claimed in claim 13, wherein said objects are moving objects.

16. The means for characterizing the environment with respect to a host vehicle as claimed in claim 13, wherein said objects are grouped according to their spatial position.

17. The means for characterizing the environment with respect to a host vehicle as claimed in claim 16, further including a means for identifying a cluster of single objects.

18. The means for characterizing the environment with respect to a host vehicle as claimed in claim 13, wherein said objects are grouped according to one or more of the following parameters: object type, spatial position, speed, and direction of movement.

19. The means for characterizing the environment with respect to a host vehicle as claimed in claim 18, wherein said object type may be one of cyclists or pedestrians.

20. The means for characterizing the environment with respect to a host vehicle as claimed in claim 13, including comparing, consequent to movement of said single object, a) the increase in the angle spanning said first group relative to said vehicle when said single object is considered belonging to said first group with b) the increase in angle spanning said second group relative to said vehicle, when said single objects is considered belonging to said second group, and dependent thereupon, determining whether said object should belong to said first or second group.

21. The means for characterizing the environment with respect to a host vehicle as claimed in claim 13, including merging two groups to form a single group.

22. The means for characterizing the environment with respect to a host vehicle as claimed in claim 20, further including a means for reformulating the boundaries of one or more of said first, second or merged groups.

23. The means for characterizing the environment with respect to a host vehicle as claimed in claim 22, wherein said groups are merged if any single object of a first group moves within a predetermined distance of any single object of a second group, or if the span angle between two adjacent groups relative to the vehicles is less than a predetermined threshold.

* * * * *